United States Patent Office 3,101,090
Patented Aug. 20, 1963

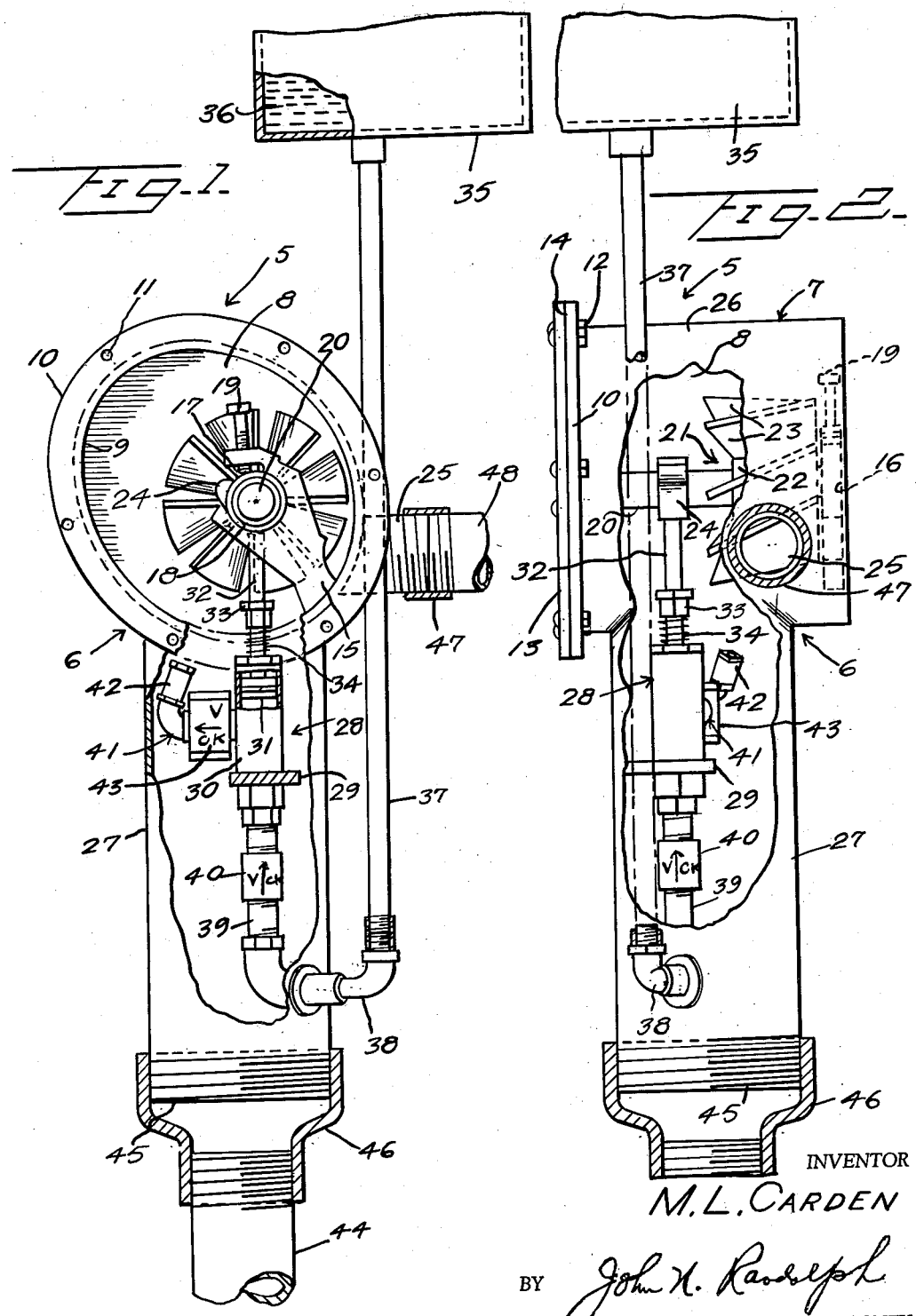

3,101,090
CHEMICAL INJECTING APPARATUS
Melvin L. Carden, Amarillo, Tex., assignor, by direct and mesne assignments, to Carden Equipment Company, Inc., Amarillo, Tex., a corporation of Texas
Filed Dec. 11, 1961, Ser. No. 158,214
1 Claim. (Cl. 137—99)

This invention relates to a unit adapted to be interposed in a liquid flow line for injecting a chemical into the flow stream.

More particularly, it is an object of the present invention to provide an improved unit adapted to be interposed in a flow line from an oil well and which unit is operated off of the well head pressure or a pumping pressure to inject a proper amount of chemical into the oil to produce an oil and chemical mixture which will prevent the accumulation of sludge, paraffin or other clogging compounds.

Still a further object of the invention is to provide an apparatus which is operated by the velocity of the flow stream so as to provide a correct ratio between the oil and injected chemical.

Various other objects and advantages of the invention will hereinafter become more fully apparent from the following description of the drawing, illustrating a presently preferred embodiment thereof, and wherein:

FIGURE 1 is a side elevational view, partly broken away and partly fragmentary, showing the injection apparatus interposed in a flow line, and FIGURE 2 is a similar view looking from right to left of FIGURE 1.

Referring more specifically to the drawing, the injection apparatus in its entirety is designated generally 5 and includes a casing, designated generally 6, having an enlarged hollow head portion 7 defining a mixing chamber 8. The head portion 7 has an open end 9 around which is disposed a continuous outwardly projecting flange 10. The flange 10 has spaced openings 11 to receive fastenings 12 by which a cover plate 13 is secured to the flange 10 for closing the open end 9. A sealing gasket 14 is interposed between the flange 10 and cover plate 13 for sealing the opening 9 when said cover plate is applied.

The head 7 is provided with two aligned bearing posts 15 and 16 which are disposed within the chamber 8 in spaced apart relation to one another and which have recesses 17 opening outwardly thereof to accommodate antifriction ball bearing units 18 which are detachably retained therein by setscrews 19 which engage threadedly through parts of the bearing posts and which extend into the recesses 17 thereof to engage stationary outer races of the ball bearing units 18. A shaft 20 extends through and is journaled in the bearing units 18. A turbine, designated generally 21, includes a hub 22 which is fixed to a part of the shaft 20, between the bearing posts 15 and 16, and a plurality of vanes 23 which project outwardly from the hub 22 and which are all similarly pitched, as seen in the drawing. The turbine 21 is located adjacent the bearing post 16, and a cam 24 is fixed to the shaft 20 and is disposed between the turbine 21 and the other bearing post 15. The turbine or rotor 21 and the cam 24 are mounted to rotate in the chamber 8.

The casing 6 includes an inlet 25 which extends outwardly from an annular wall 26 of the head 7 and which opens through said wall into the chamber 8 in alignment with the rotor or turbine 21 and below the level of the shaft 20.

The casing 6 includes an annular conduit portion 27 which is formed integral with the head 7 and projects from another part of the annular wall 26. The conduit portion 27 likewise communicates with the chamber 8 and is disposed approximately at a right angle to the inlet 25. The conduit portion 27 constitutes the outlet of the casing 6 and is substantially larger in cross section than said inlet.

A pump, designated generally 28, is supported by a bracket 29 within the conduit portion 27 and longitudinally thereof. The pump 28 includes a barrel 30 containing a reciprocating piston 31 and a piston rod 32 which extends upwardly from said piston reciprocably through the upper end of the barrel 30. A collar or nut 33 is adjustably mounted on the piston rod 32 above the barrel 30, to provide a stop for the upper end of a compression spring 34, the lower end of which bears on the barrel 30 for urging the piston 31 and rod 32 upwardly. The pump 28 is disposed in alignment with the cam 24 so that the upper end of the piston rod 32 is maintained by the spring 34 in engagement with the eccentric periphery of the cam 24.

A tank or receptacle 35 containing a chemical 36 in liquid form is disposed above the unit 5 and has a conduit 37 extending downwardly therefrom which includes a portion 38 which extends radially inward through the wall of the conduit portion 27, near the lower end thereof, and a portion 39 which extends upwardly inside the conduit portion 27 and which has an upper end connected to and communicating with the lower end of the pump barrel 30. A check valve 40 is interposed in the conduit portion 39 and opens toward the pump barrel 30.

The pump 28 also includes an outlet conduit 41 which extends laterally from an intermediate portion of the pump barrel 30 and which includes an upwardly discharging outlet end or nozzle 42. The outlet conduit 41 is provided with a check valve 43 which opens away from the barrel 30.

A conduit 44, leading to a storage tank or the like, not shown, is connected to the lower discharge end 45 of the conduit portion 27 by a reducing coupling 46. The inlet 25 is connected by a coupling 47 to a conduit 48 leading from a well, so that the casing 6 is interposed in the conduit 48, 44 through which oil passes under pressure from an oil well to a storage tank and which pressure may be supplied either by the well pressure or a suitable pump. It will be noted that the conduit portion 27 is substantially larger than the inlet nipple 25 and the conduit 44 is likewise preferably larger than said inlet nipple.

The oil discharging under pressure from the nipple 25 into the chamber 8 strikes the vanes 23 of the turbine or rotor 21 for revolving said turbine and the shaft 20 and cam 24 in a clockwise direction as seen in FIGURE 1. This rotation thus imparted to the cam 24 causes the piston rod to be displaced downwardly for forcing the piston 31 downwardly, each time that the cam lobe passes over said piston rod for expelling the chemical 36 from the barrel 30, through the conduit 41, past its check valve 43, so that the chemical is discharged from the outlet or nozzle 42 into the conduit portion 27. After the cam lobe passes over the piston rod 32, the spring 34 displaces the rod 32 and piston 31 upwardly to their positions of FIGURE 1 to thereby create a suction in the lower part of the pump barrel 30 so that additional chemical 36 is drawn into the pump barrel from the conduit portion 39, past the upwardly opening check valve 40. It will thus be seen that the pump piston 31 executes a pumping stroke and a suction stroke on each revolution of the cam 24 with the shaft 20 and turbine 21, and that the turbine is revolved by the velocity of the oil impinging against the vanes 23, so that a proper amount of the chemical 36 is mixed with the oil discharging under pressure into the chamber 8.

It will be noted that the chamber 8 is quite large in comparison to the cross sectional size of the inlet 25 and that the cross sectional size of the outlet portion 27 is also much greater than that of the inlet 25. Thus, after the oil discharges into the chamber 8 and acts upon the turbine vanes 23 it will fall by gravity from said chamber downwardly through the conduit portion 27 and will be mixed with the chemical being discharged from the nozzle 42. Oil will then flow unimpeded by gravity from the conduit portion 27 through the conduit 44 to storage. The fact that the oil flows unimpeded from the casing 6 after impinging against the turbine vanes 23 insures that there will be no stoppage of the flow adjacent to and immediately beyond the point where the chemical is mixed with the oil and which could otherwise cause a burning of the oil due to an excessive amount of the chemical therein. Additionally, the chemical is discharged by the pressure of the pump 28 upwardly into the oil which is dropping downwardly toward and into the outlet conduit portion 27 from the turbine 21, so that this oil will be spread across the area beneath the turbine, by the pitch of the vanes 23, to insure a proper mixing of the chemical with the oil and to avoid any excessive concentration of the chemical.

Since the turbine 21 will be turned only by the velocity of the oil, when oil ceases to flow, due to the well ceasing to produce oil and producing gas only, the turbine will not be driven by the gas entering the chamber 8 and the pump 28 will immediately cease to operate so that no additional chemical will be discharged from the pump nozzle 42. Thus, the rate of discharge of the chemical 36 is attuned to the flow of oil through the casing 6.

Various modifications and changes are contemplated and may be resorted to, without departing from the function or scope of the invention as hereinafter defined by the appended claim.

I claim as my invention:

A mixing chamber having a substantially horizontally arranged liquid inlet and a downwardly opening liquid outlet, said outlet being substantially larger than said inlet, a rotatable vaned turbine wheel horizontally mounted in said chamber with the axis of rotation of said wheel transverse to and slightly above said liquid inlet whereby liquid entering said chamber from said inlet impinges on the vanes of said turbine wheel to rotate the wheel, a chemical feeder mounted below said chamber, said feeder having a discharge port disposed in the liquid outlet, said discharge port extending upwardly toward and terminating beneath the turbine wheel, and means connecting the feeder to said wheel for operating said feeder on rotation of said turbine wheel, said turbine wheel vanes being spaced from the inlet and outlet such that the entering liquid is deflected by the vanes to mix with a chemical being discharged upwardly from said discharge port into the falling liquid before the liquid passes through said outlet.

References Cited in the file of this patent

UNITED STATES PATENTS

| | | |
|---|---|---|
| 976,148 | Caps | Nov. 22, 1910 |
| 1,223,021 | Allen | Apr. 17, 1917 |
| 1,720,326 | Halstead | July 9, 1929 |
| 1,726,082 | McLaughlin | Aug. 27, 1929 |
| 1,726,083 | McLaughlin | Aug. 27, 1929 |
| 2,148,671 | Allen | Feb. 28, 1939 |

FOREIGN PATENTS

| | | |
|---|---|---|
| 368,033 | Italy | Feb. 8, 1939 |